No. 638,259. Patented Dec. 5, 1899.
A. MYERS.
YEASTING PROCESS.
(Application filed July 8, 1899.)
(No Model.)
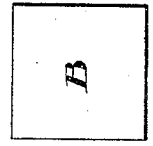
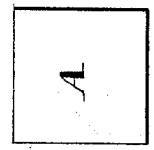
WITNESSES:
Arthur E. Paige
F. Norman Dixon
INVENTOR:
Angelo Myers
by his attorney
Wm A Swanton

UNITED STATES PATENT OFFICE.

ANGELO MYERS, OF PHILADELPHIA, PENNSYLVANIA.

YEASTING PROCESS.

SPECIFICATION forming part of Letters Patent No. 638,259, dated December 5, 1899.

Application filed July 8, 1899. Serial No. 723,134. (No specimens.)

*To all whom it may concern:*

Be it known that I, ANGELO MYERS, a citizen of the United States, residing in the city and county of Philadelphia, in the State of Pennsylvania, have invented certain new and useful Improvements in Yeasting Processes, of which the following is a specification.

My invention relates to the production or development of yeast for use in breweries and distilleries.

In the development of yeast in accordance with my invention, two series of fermenting vessels, diagrammatically depicted in the accompanying drawing, may be employed, one series designated A, B, C, D, E, etc., and herein termed fermenters, and another series designated 1, 2, 3, 4, 5, etc., of much smaller capacity than the fermenters, and termed "donas."

It is customary in the conduct of breweries and distilleries, to make up for use on each succeeding working day, a fresh batch of yeast, and as some time is required for the production or development of this yeast to secure the proper quantity, of the desired strength, a number of batches in different stages of development are usually contemporaneously in progress and so ordered that one batch comes to proper condition for use on each successive working day.

The fermenters are each filled or nearly filled with a selected quantity of grain, usually rye and barley malt in equal proportions. The rye will be mashed usually at a temperature of about 176 degrees Fah., immediately cooled down to about 159 degrees Fah. or below and, at this temperature the malt is put into the rye and the mass stirred. After stirring the mass thoroughly it is generally cooled down to a temperature of about 135 degrees, Fah. at which temperature it is allowed to remain for a period of about twenty-four hours, to produce sour mash, if desired, and it is then cooled to a temperature of about 70 degrees, Fah.

By sour mash is meant the mass after it has been allowed to stand for a certain length of time without the addition of yeast. The lactic germs in the mass produce an acid and are not true ferments. Sour mash, when fermented with true alcoholic ferments, such as are introduced with the dona, whereof hereinafter, is what is termed a sour yeast.

While each of the fermenters is supplied with grain as stated, and treated in the manner above described, or in any preferred manner, the supplying of the grain to the several fermenters, and its treatment in the manner described, is not carried on on the same day, but one of the fermenters, for instance, the fermenter A, is supplied with grain on, for instance, Tuesday morning, the fermenter B on Wednesday morning, the fermenter C on Thursday morning, the fermenter D on Friday morning, and the fermenter E on Saturday morning, the sequence of the operations being so ordered that each fermenter of the series is supplied with grain at or about the time at which the materials placed in the preceding fermenter of the series have developed the required quantity of the lactic acid.

Assuming for the sake of illustration merely, that the fermenters are to be supplied with grain in the order and on the days mentioned, my invention may be practiced conveniently in the following manner.

On the Monday morning preceding, or a suitable number of hours in advance of, the Tuesday mentioned, "dona" No. 1 is supplied with grain mash, preferably rye and barley malt, combined in the same proportions, subjected to the same temperatures, and treated to the same operation of stirring, described with reference to the contents of the fermenters, with the result that after the contents of said "dona" have stood for, say, twenty-four hours, they will constitute on Tuesday morning, when the fermenter A is filled, a sour mash.

On Tuesday morning, therefore, about the time fermenter A is charged or filled as described, a predetermined quantity of "jug yeast" is incorporated with the sour mash in "dona" No. 1, and the contents of said "dona" No. 1 thereupon permitted to stand for a period of twenty-four hours or thereabout, with the result that the contents of said "dona" will by Wednesday morning be converted into active yeast of the character of the "jug yeast."

It is the practice in the conduct of large brewery and distillery operations to develop the yeast required by any ordinary method, from small quantities kept in storage for the purpose and termed "jug yeast."

The jug yeast, which may be of any selected morphological character, is ordinarily made the subject of especial precautions in its manufacture and storage, tending to maintain its purity and strength, and many efforts have been made to devise means for providing jug yeast, whatever its variety, of absolutely uniform quality.

In the practice of my present invention, jug yeast corresponding in character to the character of the ultimate yeast desired will be, of course, employed.

On Wednesday morning, the contents of "dona" No. 1 will be yeast, and the contents of fermenter A will be sour mash. On Wednesday morning I charge or fill fermenter B with mashed grain in the manner already described; I fill "dona" No. 2 with sour mash from fermenter A, and add to said sour mash in "dona" No. 2 a selected quantity of fresh "jug yeast;" and I incorporate with the contents of fermenter A the contents of "dona" No. 1.

The materials in the fermenter A will, in the progress of time, be acted upon and converted into yeast of the character contained in "dona" No. 1, which was, of course, of the character of the "jug yeast," and, at the appointed time, the contents of said fermenter No. 1 will be employed as yeast for the fermentation of a mass of grain or mash in the larger operations of the brewery or distillery.

On Thursday morning the contents of fermenter B will be sour mash and the contents of "dona" No. 2 will be yeast.

I thereupon supply fermenter C with grain in the manner described, and supply "dona" No. 3 with sour mash from fermenter B, and set said "dona" No. 3 with a selected quantity of "jug yeast," and thereupon allow said fermenter C and "dona" No. 3 to stand for a period of twenty-four hours. On said Thursday morning also I supply to the fermenter B, the contents of "dona" No. 2, and thereupon allow the combined mass to stand for the required number of hours or days to be in readiness for use after the contents of fermenter A are used in the brewery or distillery.

On Friday morning the contents of fermenter C will be sour mash and the contents of "dona" No. 3 will be yeast similar to the "jug yeast." On said morning I charge fermenter D with grain in the manner described, and supply "dona" No. 4 with sour mash from fermenter C and set it with "jug yeast." I add to the contents of fermenter C the yeast in "dona" No. 3, and put it aside to stand for the required number of hours or days, to be used after the contents of fermenter B are used.

On Saturday morning the contents of fermenter D will be sour mash, and the contents of "dona" No. 4 will be yeast. On said morning I supply "dona" No. 5 with sour mash from fermenter D, and set it with the required quantity of "jug yeast," and I combine the contents of "dona" No. 4 with the contents of fermenter D.

The operations described are repeated on each successive day, (or more frequently or less frequently as desired,) a fermenter being each time supplied with grain mash of the desired character, mashed in the preferred manner, and at the desired temperatures. Each day I set apart a portion of sour mash from the fermenter supplied with grain mash the preceding day, and set said sour mash with "jug yeast,"—and each day I combine with the sour mash contained in the fermenter which was charged with grain the preceding day, yeast resulting from the admixture of "jug yeast" with sour mash, and which have stood for a period of about a day.

In the practice of my invention the operations described may be repeated with any desired frequency compatible with securing the result described.

It is to be understood that instead of employing the number of fermenters illustrated or a greater number, a smaller number of these containers may be employed. In setting the contents of a fermenter with the yeast of a "dona," the materials may be of course permitted to stand in the fermenter until actually used in the brewery or distillery, or they may be removed from the fermenter immediately and allowed to stand in a separate vessel until used, thus allowing the fermenter to receive a second charge of fresh mashed grain as soon as its first charge has been treated and removed.

So also the operation may be carried on with but one "dona," which will be each day filled with sour mash from a fermenter, immediately set with "jug yeast," the next morning emptied into the appropriate fermenter, and immediately refilled with sour mash and reset with "jug yeast" and so on.

I have, however, illustrated and referred to the series of fermenters and jugs described for the purpose of simplifying the description of the operation.

The grain employed in the fermenters A, B, C, etc., will be about two pounds to each bushel mashed in the distillery or brewery,— the "donas" each contain about three pounds of grain to each bushel of grain in the fermenters A, B, C, etc., and "jug yeast" in about the proportion of three gallons to each thousand bushels of grain mashed in the brewery or distillery.

It will from a consideration of the steps or operations described be understood that the mashed grain with which each fermenter is charged in succession is allowed to stand for a usual period, as for instance, twenty-four hours, to become soured, and that each such lot or charge of mashed grain is, after having become soured, divided into two portions (which may be conveniently referred to as the first and second portions.)

The first portion of each such lot is set with "jug yeast" to be transformed into yeast of the character of said "jug yeast," to be added to the second portion of the next succeeding lot of soured mash,—and that the second portion of each lot is set with yeast already produced as a result of combining "jug yeast" with the first portion of the preceding lot of soured mash, said second portion being thereupon allowed to stand until in readiness for use in operations of yeasting in brewery or distillery work.

By my invention there will be produced for use in successive brewery and distillery operations, batches of yeast of definite and uniform strength, one of the purposes of my invention being to prevent the degeneration of the plant or yeast used, and I am able by the practice described to secure for the conduct of brewery or distillery yeasting operations, yeast uniform with the jug yeast selected, and the strength and purity of which have been subjected to the minimum of degeneration.

Having thus described my invention, I claim—

The process of preparing a series of batches of yeast of uniform quality for use *seriatim* upon successive days in brewery or distillery yeasting operations,—which consists in mashing in suitable fermenters upon successive days or recurring periods selected lots or quantities of suitable grain,—allowing each to stand for a predetermined period after mashing, at a suitable temperature, to develop lactic acid or become sour,—dividing each successive lot after it has become sour into two portions, viz. first and second,—setting the first portion of each such lot with "jug yeast" and allowing it to stand to be converted by said "jug yeast" into yeast of the character of said "jug yeast," to be added to one portion of the next succeeding lot of sour mash,—setting the other or second portion with yeast theretofore produced as a result of combining the first portion of the preceding lot of sour mash with "jug yeast,"—and allowing said second portion to stand until in readiness for use in final operations of yeasting in brewery or distillery operations, as specified.

In testimony that I claim the foregoing as my invention I have hereunto signed my name this 30th day of June, A. D. 1899.

ANGELO MYERS.

In presence of—
   G. A. SCHWAB,
   THOS. K. LANCASTER.